(12) United States Patent
Fukazawa et al.

(10) Patent No.: US 9,499,957 B2
(45) Date of Patent: *Nov. 22, 2016

(54) BULLDOZER WITH IMPROVED VISIBILITY

(71) Applicant: KOMATSU LTD., Tokyo (JP)

(72) Inventors: Kazumasa Fukazawa, Nomi (JP); Masayuki Mukaino, Kawasaki (JP); David Andrews, Hixson, TN (US)

(73) Assignee: KOMATSU LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/178,478

(22) Filed: Feb. 12, 2014

(65) Prior Publication Data

US 2014/0158387 A1 Jun. 12, 2014

Related U.S. Application Data

(63) Continuation of application No. 10/681,253, filed on Oct. 9, 2003, now Pat. No. 8,695,722.

(51) Int. Cl.
*E02F 3/80* (2006.01)
*B60K 11/04* (2006.01)
*B62D 55/06* (2006.01)
*E02F 9/08* (2006.01)
*E02F 3/76* (2006.01)

(52) U.S. Cl.
CPC .............. *E02F 3/80* (2013.01); *B60K 11/04* (2013.01); *B62D 55/06* (2013.01); *E02F 3/7609* (2013.01); *E02F 9/0808* (2013.01); *E02F 9/0858* (2013.01); *E02F 9/0891* (2013.01)

(58) Field of Classification Search
CPC ... E02F 9/0808; E02F 9/0891; E02F 9/0858; E02F 3/80; E02F 3/7609; B60K 11/04; B62D 55/06
See application file for complete search history.

(56) References Cited

U.S. PATENT DOCUMENTS

| | | | |
|---|---|---|---|
| 2,247,962 A | 7/1941 | Ormsby et al. | |
| 2,503,411 A | 4/1950 | Prouse | |
| 2,789,647 A | 4/1957 | Couse | |
| 3,451,494 A | 6/1969 | Kowalik | |
| 3,539,022 A * | 11/1970 | Berg | E02F 3/80 172/819 |
| 3,715,001 A | 2/1973 | Wilson | |
| 3,827,523 A | 8/1974 | Williams | |
| 3,929,202 A | 12/1975 | Hobbensiefken | |
| 3,934,644 A | 1/1976 | Johnston | |
| 3,956,835 A * | 5/1976 | Evenson | E02F 3/8152 172/438 |

(Continued)

FOREIGN PATENT DOCUMENTS

| | | |
|---|---|---|
| EP | 1 114 897 A2 | 7/2001 |
| JP | 51-63032 B | 11/1976 |

(Continued)

*Primary Examiner* — Jamie L McGowan
(74) *Attorney, Agent, or Firm* — Global IP Counselors, LLP (57) ABSTRACT

A bulldozer includes a vehicle frame, a bulldozer blade, an engine, an engine cover and an operator cab. The vehicle frame has a front end and a rear end. The bulldozer blade is disposed in front of the front end of the vehicle frame. The engine is disposed at a front portion of the frame. The engine cover covers the engine. The operator cab is secured to the frame behind the engine. The operator cab includes a front window disposed on a front face of the operator cab. When the bulldozer blade is placed on the ground, a top surface of the engine cover is disposed below a line extending between an upper edge of the bulldozer blade and a lower edge of the front window as viewed from a side of the bulldozer.

20 Claims, 8 Drawing Sheets

(56) References Cited

U.S. PATENT DOCUMENTS

| | | |
|---|---|---|
| 3,978,938 A | 9/1976 | Joscher et al. |
| D251,845 S | 5/1979 | Joupperi et al. |
| 4,362,208 A | 12/1982 | Hauser |
| 4,448,274 A | 5/1984 | van der Lely |
| D274,333 S | 6/1984 | Meisel, Jr. et al. |
| 4,590,891 A | 5/1986 | Fujikawa et al. |
| 4,821,808 A | 4/1989 | Gurries |
| 5,413,188 A * | 5/1995 | Ui .................. 180/89.12 |
| 6,009,643 A | 1/2000 | Maeba et al. |
| 6,152,253 A | 11/2000 | Monaghan |
| 6,443,253 B1 | 9/2002 | Whitehead et al. |
| 6,468,153 B2 | 10/2002 | Sheidler et al. |
| D483,043 S | 12/2003 | Akashima et al. |
| 2001/0006128 A1 | 7/2001 | Contoli et al. |
| 2001/0015296 A1 | 8/2001 | Sewell |
| 2002/0030397 A1 | 3/2002 | Tamura et al. |
| 2002/0053480 A1 | 5/2002 | Pack |
| 2003/0156937 A1 | 8/2003 | Brown et al. |

FOREIGN PATENT DOCUMENTS

| | | |
|---|---|---|
| JP | 61-84127 U | 6/1986 |
| JP | 3-49114 U | 5/1991 |
| JP | 5-106240 A | 4/1993 |
| JP | 2002-206253 A | 7/2002 |
| JP | 2002-235339 A | 8/2002 |

* cited by examiner

BULLDOZER WITH IMPROVED VISIBILITY

CROSS-REFERENCE TO RELATED APPLICATIONS

This application is a continuation application of U.S. patent application Ser. No. 10/681,253 filed on Oct. 9, 2003. The entire disclosure of U.S. patent application Ser. No. 10/681,253 is herewith incorporated herein by reference.

BACKGROUND OF THE INVENTION

1. Field of the Invention

The present invention relates to a work vehicle. More particularly, the present invention relates to a work vehicle, such as a bulldozer, where improved forward visibility for the working machine is provided. The improved visibility can be achieved by arranging the engine at the front of the work vehicle, while arranging the cooling module or radiator assembly for cooling the engine in a rear of the vehicle.

2. Description of the Related Art

Figure 1:
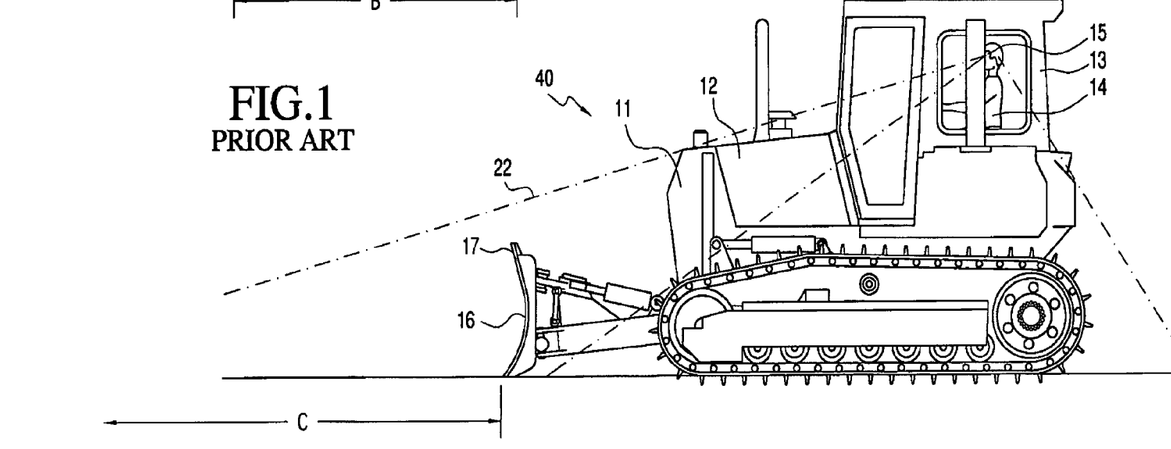
FIG. 1 is a side view of a conventional bulldozer including forward and rearward lines of sight for the operator.
Figure 6A:
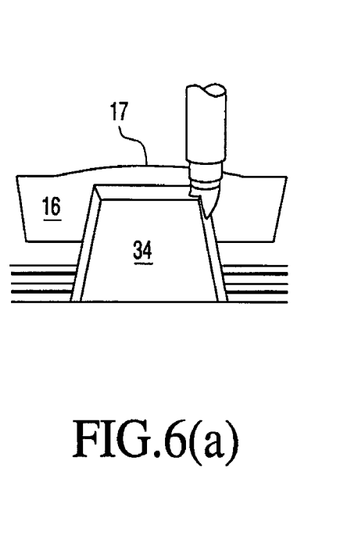
FIG. 6(a) is a view from the eye point within the cab of a bulldozer in accordance with the present invention.
Figure 6B:
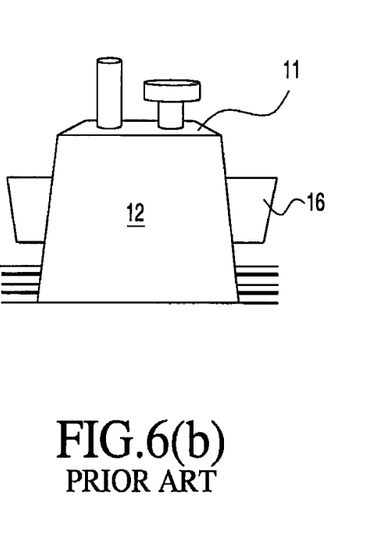
FIG. 6(b) is a view from the eye point within the cab of a conventional bulldozer.
Figure 7:
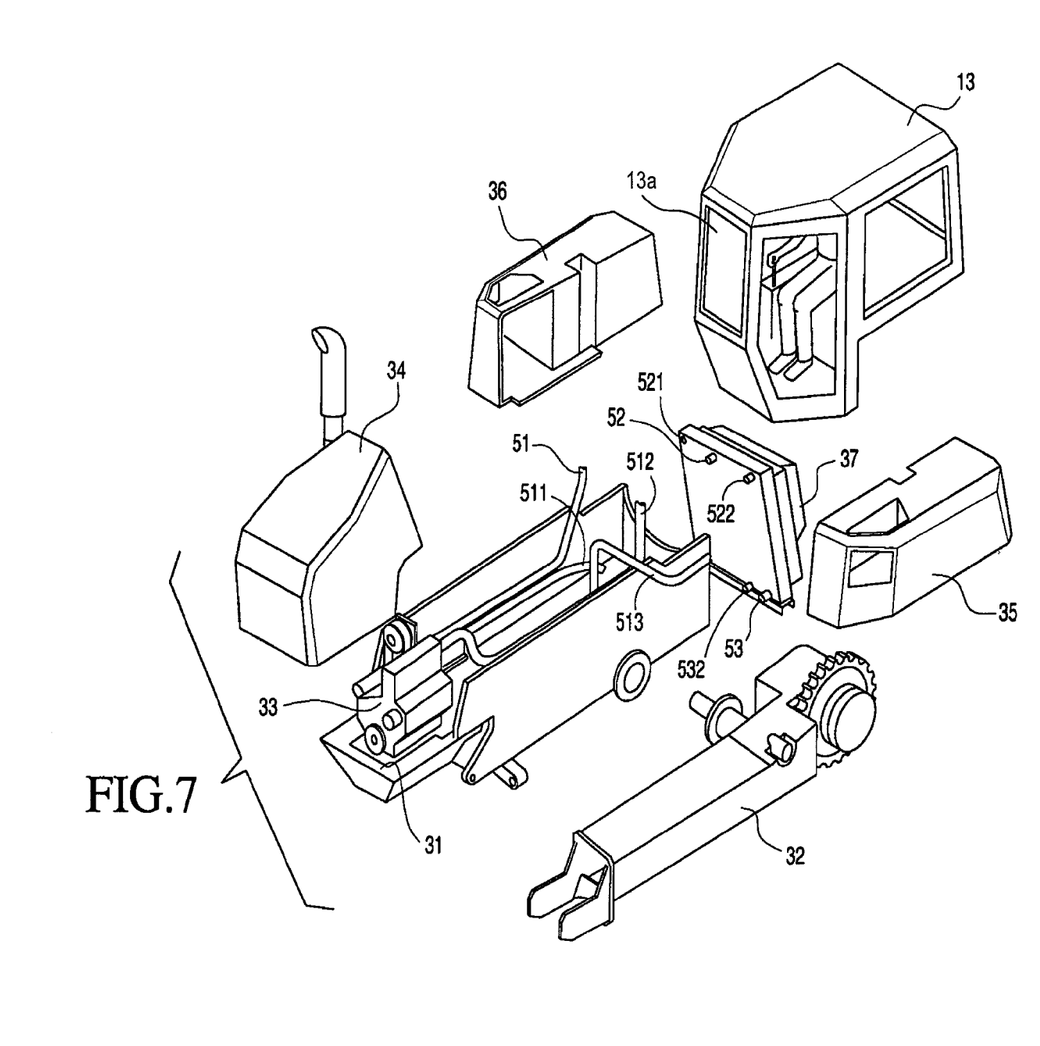
FIG. 7 is an exploded view of a bulldozer in accordance with the present invention.

In a work vehicle, particularly, in a bulldozer, the engine is mounted at the front of the vehicle, and the radiator assembly 11 for cooling the vehicle engine is arranged in front of the engine. A conventional bulldozer 40 is shown in FIG. 1. In the conventional bulldozer, the radiator assembly 11 is arranged in front of the engine and engine compartment. A hood 12 covers the engine compartment, and a cabin or cab 13 is arranged near the back end of the work vehicle. When operating the conventional bulldozer, the visibility of the operator 14 is blocked by the radiator or radiator assembly 11 and the hood 12. As shown in FIG. 1, the operator of the conventional bulldozer 40 cannot see the top center portion 17 of the bulldozer blade 16. In particular, the lowest line of sight 22 from the eye point 15 of the operator 14 must pass over the top of the radiator assembly 11 and hood 12. FIG. 6(b) shows the operator's view from within the cab of a conventional bulldozer. As shown therein, the operator's view is blocked by engine cover or hood 12 and the radiator assembly 11. In particular, the operator can only see the ends of the blade 16, and the center of the blade 16 is completely blocked by the radiator assembly 11 and the hood 12. Due to the fact that the operator cannot see the center of the blade, it is easy for the material being moved by the blade to heave or rise over the top center portion 17 of the blade 16. This leads to inefficient movement of material and can cause problems. In addition, since the forward vision of the operator of the conventional work vehicle or bulldozer is blocked by radiator assembly 11 and hood 12, the operator must estimate the location of the bulldozer blade during use, based on his or her experience. These estimates can easily be off by a few inches or more, which can result in damaging the surface below the desired depth or by not removing material to the desired depth, either of which increases time and costs.

The size of the radiator in a work vehicle, such as a bulldozer, is defined by the heat rejection needs of the engine. The radiator in the cooling module or radiator assembly must be a certain size in order to obtain the heat rejection necessary for the engine used. Therefore, the forward visibility of the operator cannot be improved by reducing the size of the radiator. Normally, when designing work machines, the size of the radiator is firstly determined, and then the machine is designed around the radiator with the predetermined size. Since the radiator must be a certain size, when it is arranged in the front of the vehicle, it necessarily will block the forward visibility of the operator of the work vehicle. The present invention overcomes the aforesaid disadvantages and other disadvantages of the conventional work vehicle.

SUMMARY OF THE INVENTION

According to one aspect, a bulldozer includes a vehicle frame, a bulldozer blade, an engine, an engine cover and an operator cab. The vehicle frame has a front end and a rear end. The bulldozer blade is disposed in front of the front end of the vehicle frame. The engine is disposed at a front portion of the frame. The engine cover covers the engine. The operator cab is secured to the frame behind the engine. The operator cab includes a front window disposed on a front face of the operator cab. When the bulldozer blade is placed on the ground, a top surface of the engine cover is disposed below a line extending between an upper edge of the bulldozer blade and a lower edge of the front window as viewed from a side of the bulldozer.

BRIEF DESCRIPTION OF THE DRAWINGS

Other features and advantages of the present invention will be understood from the following "Detailed Description of the Invention," made with reference to the appended drawings in which.

DETAILED DESCRIPTION OF THE INVENTION

Referring to the drawings and, more particularly, to FIGS. 3, 4, 5, and 7, a simplified view of a work vehicle 30 is shown according to the present invention. The mainframe module or vehicle frame 31 of this work vehicle is supported by track frame modules 32, which are arranged at the left and right sides of the mainframe module or vehicle frame 31. The work vehicle 30 includes an engine 33 and engine compartment arranged adjacent the front of the mainframe module or vehicle frame 31. A nose module 34 covers the engine and engine compartment. The nose module 34 can be a one-piece nose module. A cabin or cab 13 accommodates an operator's seat, an instrument panel, a steering mechanism, etc. The cabin or cab 13 is secured to the mainframe module or vehicle frame 31 and arranged behind the engine 33 and engine compartment, which are covered by the nose module 34. Cab 13 is elastically supported by cab support members (not shown). The cab 13 includes a front window 13*a* disposed on a front face of the 13. The bulldozer blade 16 is supported on a blade support member 16A that is coupled to the vehicle frame 31. An hydraulic tank module 35 for supplying hydraulic fluid to working implements of the work vehicle, such as for operating the bulldozer blade 16 etc., is arranged at a side of the cab 13 near the bottom of the cab 13, and a fuel tank module 36 for supplying fuel to the engine 33 is arranged at another bottom side of the cab 13 near the bottom of the cab 13.

Figure 5:
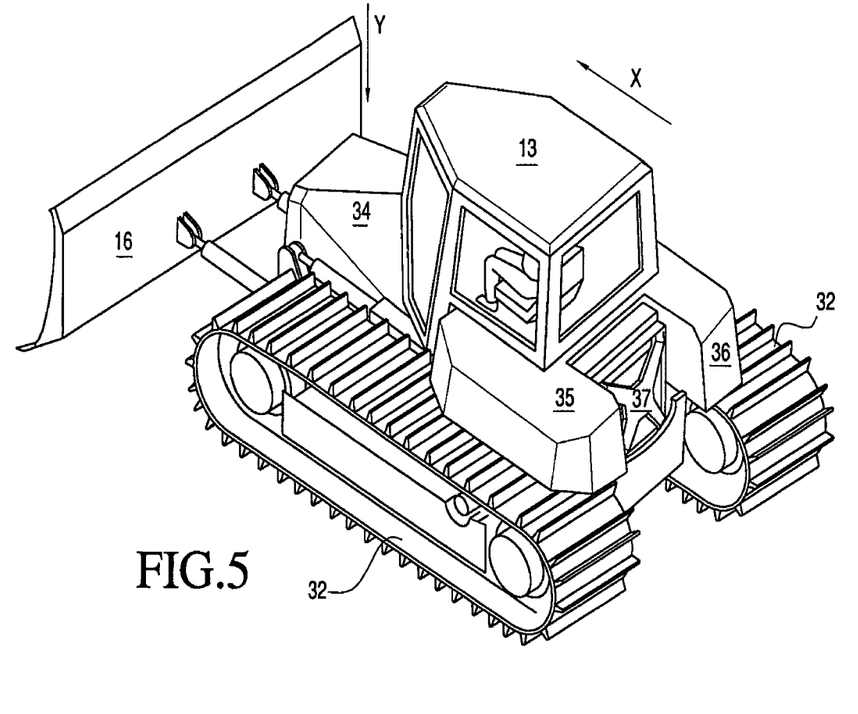
Figures 8, 9, 10, 11:
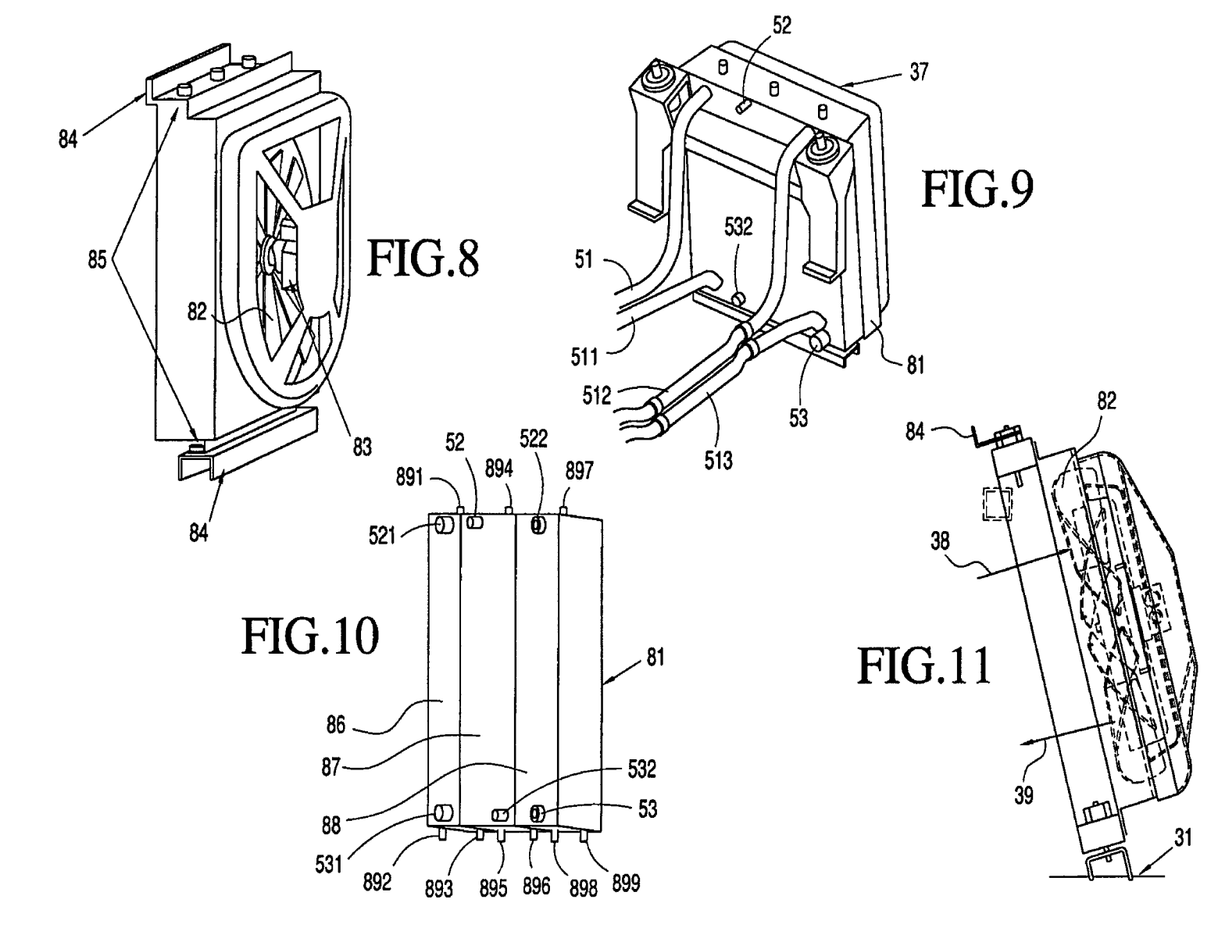
FIG. 8 is a perspective view of a fan assembly for a cooling module in accordance with the present invention.
FIG. 9 is a perspective view of a cooling module in accordance with the present invention.
FIG. 10 is a perspective view of a core element for a cooling module in accordance with the present invention.
FIG. 11 is a perspective view of a fan assembly for a cooling module in accordance with the present invention.

A radiator assembly or cooling module 37 can be arranged at the rear of the work vehicle. As shown in FIG. 5, the cooling module 37 can be arranged behind the cab 13 and between the rear ends of the hydraulic tank module 35 and fuel tank module 36. This arrangement provides excellent visibility behind the work vehicle, because the operator can see over the cooling module 37 and between the hydraulic tank module 35 and the fuel tank module 36. The cooling module can include a radiation core 81, with a charged air cooling (CAC) unit 86, oil cooling unit 87, water cooling unit 88, and a fan 82, as shown in FIGS. 8, 9, 10, and 11. The radiator assembly can be fixed to the main body by mount brackets 84 secured by pins or bolts 891, 894, 897, 892, 893, 895, 896, 898, and 899 as shown in FIGS. 8 and 10. The bolts or pins are fitted in upper and lower rubber mounts or other cushioning material 85 that can be sandwiched between the radiator assembly and the main body. The lower mount bracket 84 in FIG. 8 is installed with the mainframe module 31 shown in FIG. 7; the upper mount bracket 84 is installed with the gate type (.pi. type) bracket and installed in the mainframe module 31. Other known methods can also be used for securing the radiator assembly to the main body.

The direction of airflow through the radiator 81 can be from left to right as shown by arrow 38 in FIG. 11. When cleaning is necessary the air can be forced to flow in a reverse direction following arrow 39 as shown in FIG. 11. The fan 82 can be driven electrically or hydraulically, independent of the engine, such as by an electrical motor or a hydraulic motor 83. In a preferred arrangement, a hydraulic fan drive is used to vary the fan speed. As shown in FIGS. 7-10, cooling fluid conduits 512 and 513 are connected to inlet 522 and outlet 53 of the cooling module 37 and pass charged air between the cooling module and the engine for cooling engine intake air. Similarly, conduits 51 and 511 are connected to inlet 521 and outlet 531 of the cooling module 37 for cooling engine cooling fluid. Additional conduits (not shown) connect to inlet 52 and outlet 532 of the cooling module 37 for providing cooled fluid to the hydraulic system of the vehicle.

In the present invention, the radiator assembly or cooling module 37 is removed from the engine compartment. For example, the cooling module 37 including the fan 82 and the radiation core 81 can be moved elsewhere in the work vehicle to a location not between the operator's eye point in the cab 13 and the bulldozer blade 16, so that it does not impede visibility of the bulldozer blade 16. Preferably, the cooling module is arranged behind the cab 13. Without the cooling module 37 or radiator core 81 of the cooling module, the engine compartment can be reduced in size and the engine can be moved forward. Reducing the size of the engine compartment and/or moving the engine forward, allows the vehicle cab 13 to be moved forward. This arrangement improves the operator's visibility in the front of the work vehicle by providing a wider angle of forward visibility for the operator of the work vehicle.

Figure 2:
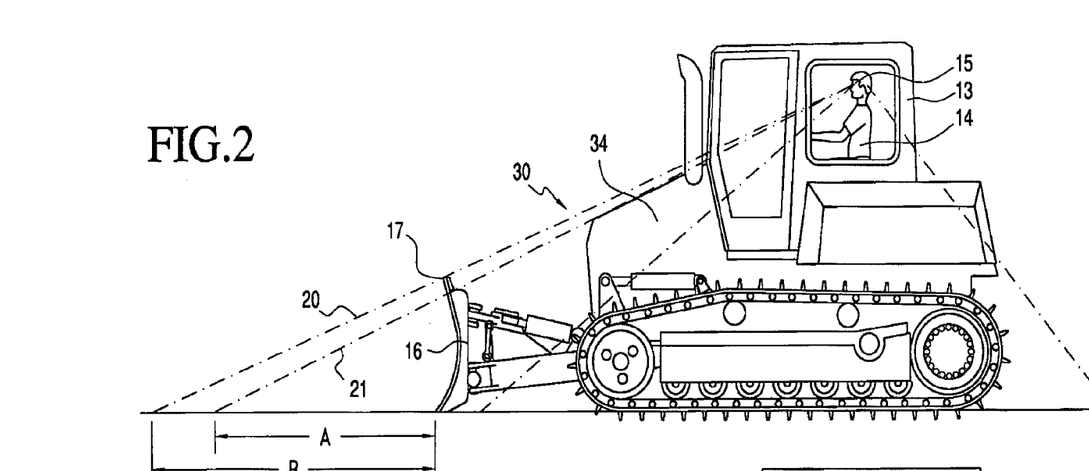
FIG. 2 is a side view of a bulldozer in accordance with the present invention including forward and rearward lines of sight for the operator.

In addition, removing the radiator assembly or cooling module 37 from the engine compartment allows the engine cover or nose module 34, which covers the engine compartment, to be made smaller. The engine compartment and thereby the cover or nose module 34 can be made smaller in volume, by reducing any of the three dimensions of width, height, and depth. Reducing the height of the front end of the nose module 34 is preferred, because this arrangement significantly improves the operator's visibility in the front of the work vehicle without diminishing the operator's visibility in the rear of the work vehicle. In this preferred embodiment, the nose module has a top that slopes downward, more preferably steeply downward, from the middle portion of the vehicle toward the front of the vehicle. As shown in FIGS. 2 and 6(*a*), the top center portion 17 of the bulldozer blade 16 is within the operator's view in accordance with the present invention. This is not possible in the conventional arrangement shown in FIGS. 1 and 6(*b*).

As shown in FIG. 2, the lowest line of sight 21 from the eye point 15 of the operator 14 in a bulldozer in accordance with the present invention passes over the top of the nose module 34, so that the upper center portion 17 of the bulldozer blade is visible to the operator. An important advantage of the present invention is that the operator can see above the top center portion 17 of the bulldozer blade as shown by line of sight 20. This enables the operator of the bulldozer to monitor heaving or rising of any material above the top center portion 17 of the blade 16, when operating the bulldozer. In addition, the arrangement of the present invention does not adversely affect rear visibility in that the rear visibility for the conventional bulldozer and for the work vehicle in accordance with the present invention is about the same. The rear perspective view in FIG. 5 shows that the operator can see over the cooling module 37 between the hydraulic tank module 35 and the fuel tank module 36. In this arrangement, rear visibility is limited by the cabin or cab 13.

Figure 3:
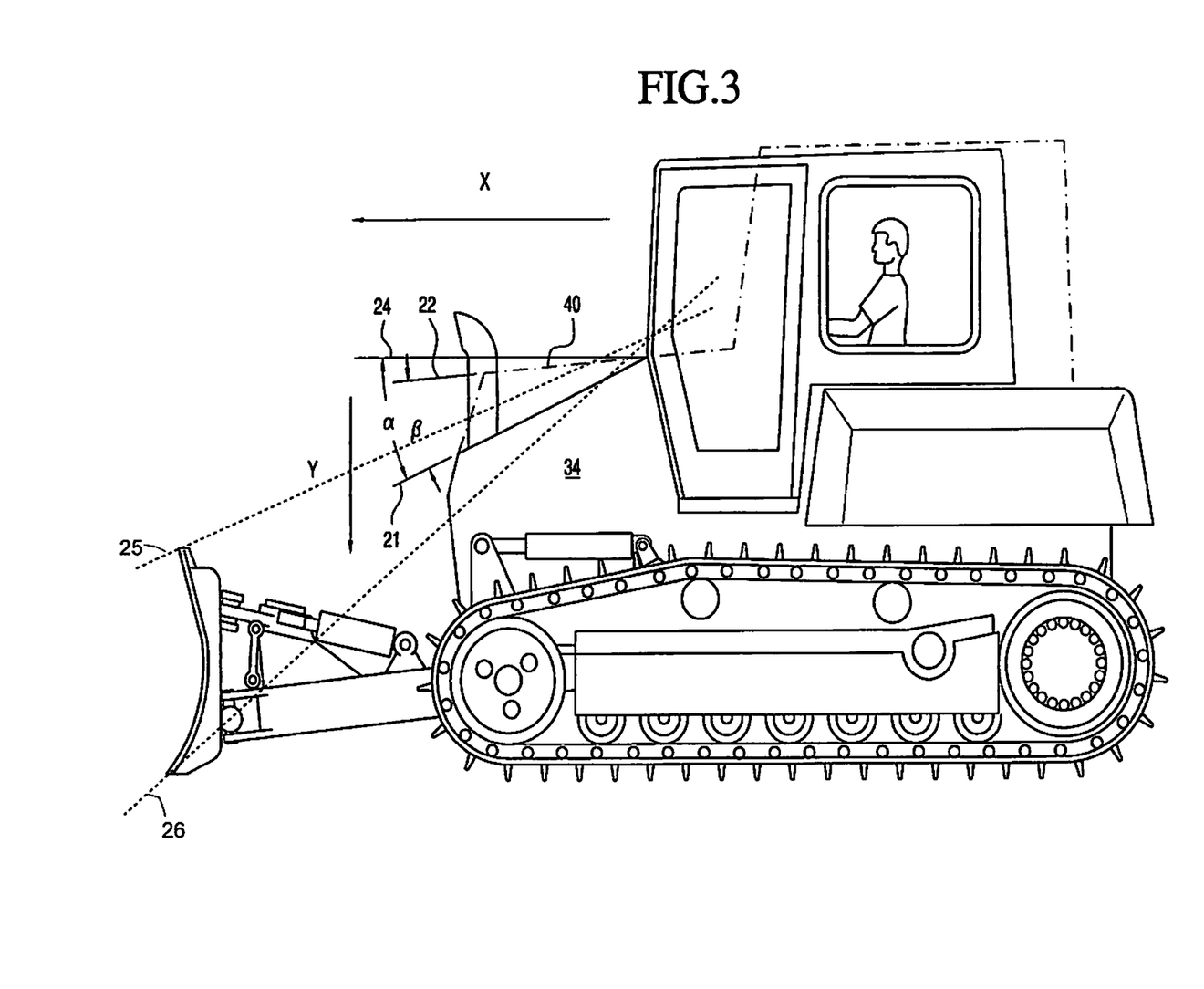
FIG. 3 is a side view comparing the present invention with a conventional bulldozer.

Attention is directed to FIG. 3 of the present application, where the arrangement of the work vehicle in accordance with the present invention is compared to the prior art arrangement of a work vehicle. In FIG. 3, the solid lines show the present invention. The broken lines in FIG. 3 show a corresponding outline of a conventional work machine. Line 24 is a horizontal line. Line of sight 22 corresponds to a conventional bulldozer 40 as discussed above, and line of sight 21 corresponds to a work vehicle 30 according to the present invention, also as discussed above. The present invention can provide a line of sight 21 that is significantly lower than that of the conventional bulldozer. For example, the line of sight 21 in accordance with the present invention can increase visibility an amount, such as 10 to 30 degrees or more, preferably by about 23 degrees as shown by angle $\alpha$ in FIG. 3. The increase in visibility over the conventional line of sight 22 is shown by angle $\beta$.

A preferred arrangement of the work vehicle in accordance with the present invention includes the nose module 34 with a lowered front end and a cab 13 that is shifted forward as shown in FIG. 3. For example, the arrangement of the work vehicle in accordance with present invention permits the cab to be shifted forward along the x-axis a significant amount, such as about 500 mm, and permits the front end of the nose module to be lowered along the y-axis a significant amount, such as about 350 mm. Additionally, in the preferred arrangement, a top surface the nose module 34 is disposed below a line 25 extending between an upper edge of the bulldozer blade and a lower edge of the front window in a side view of the bulldozer (e.g., the view shown in FIG. 3) when the bulldozer blade 16 is placed on the ground. Further, in the preferred arrangement, the top surface of the nose module 34 slopes less steeply than a line 26 extending between a lower edge of the bulldozer blade and a lower edge of the front window as viewed from a side of the bulldozer when the bulldozer blade 16 is placed on the ground.

Figure 4:
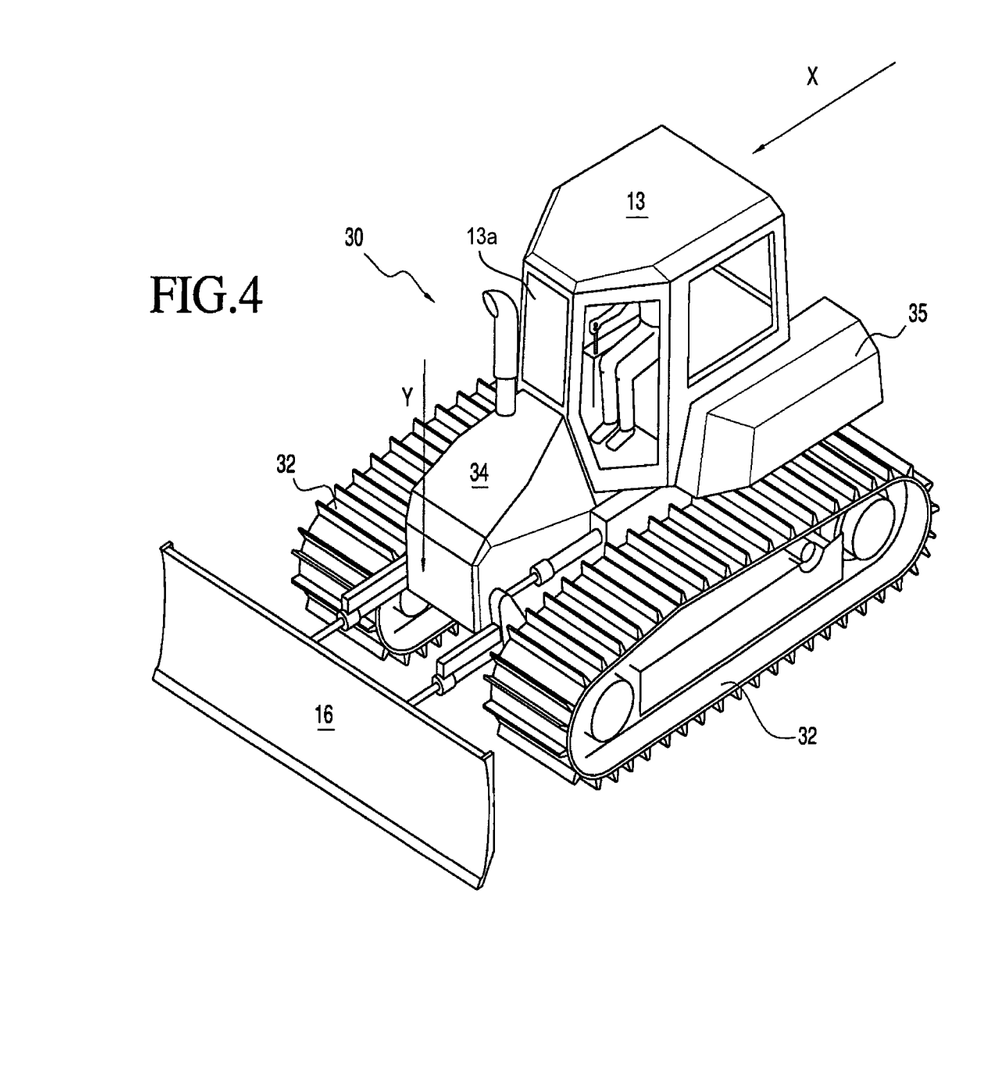
FIGS. 4 and 5 are front and rear perspective views of a bulldozer in accordance with the present invention.

The forward location of the cab along the x-axis and the downward location of the front of the nose module 34 along the y-axis are also shown in FIGS. 4 and 5. The arrangement of the work vehicle in accordance with present invention reduces the operator's blind area in front of the bulldozer blade to a length A or B, or by about 23 degrees or more as shown in FIGS. 2 and 3. The nose module can be designed to increase visibility by other degrees such as 10 degrees to 30 degrees or more. On the other hand, the arrangement of the conventional work vehicle requires a significant larger blind area for the operator having a length C, as shown in FIG. 1.

Figure 12:
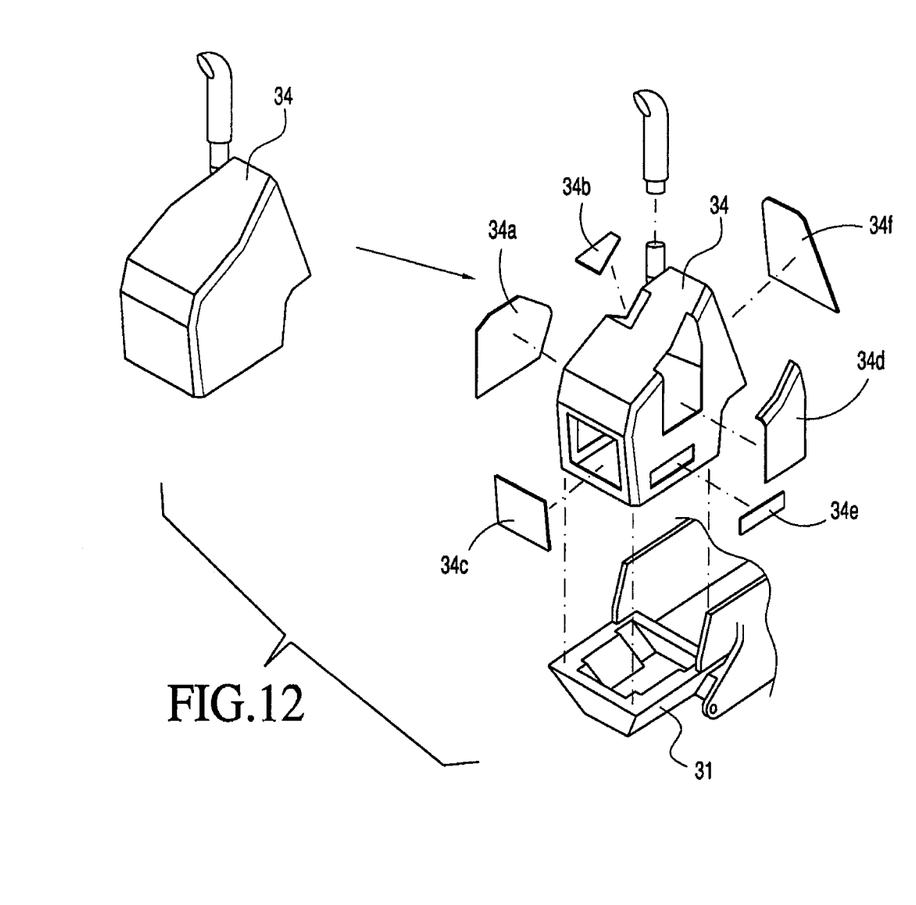
FIG. 12 is an exploded view of a nose guard structure and assembly way in accordance with the present invention.

In the present invention, the nose module 34 as shown in FIG. 12 is structured with front (34c), side (34a, 34b, 34d, 34e), and rear panels (34f that are welded, bolted, or otherwise secured together. The nose module 34 can have a sufficiently closed structure that prevents outside air from contacting the engine during operation of the work. Gaskets or other sealant materials can be used between the panels 34a-34f and the main portion of the nose module 34 for sealing the module and/or reducing vibration. A separate exhaust pipe is can be attached to the top of the nose module 34 by clamp. The nose guard 34 is attached to the main frame 31 by bolts or other appropriate means known in the art as shown in FIG. 11. The nose module 34 does not need to be ventilated. This is because there is no need to pull or push air through the engine compartment by fan, so that the air passes through a radiator for heat transfer. Thus, the engine cover or nose module 34 in the present invention can be closed. This prevents dirt from depositing on the engine and contaminating the engine parts from air as it passes over the engine, so that the interval of servicing the engine can be increased. The closed engine cover also reduces the noise of the engine. This improves the conditions of operation to be more efficient, safe, and acceptable to the environment. For these reasons, the present invention provides significant advantages over the conventional arrangement.

When air is pulled across the engine, one third of the heat rejection necessary to cool the engine can be radiated off the engine or engine block, another one third of the heat rejection goes out the exhaust, and a final third of the heat rejection is transferred to the coolant in the cooling system of the work vehicle. In the arrangement with the present invention where air is not pulled or pushed over the engine block, the radiator can be made bigger, if necessary. Any size increase of the radiator is reduced by the fact that air supplied to the radiator from around the work vehicle is cooler than that air supplied to the radiator after passing over the engine, so that a greater heat transfer is provided across the radiator. In other words, a greater cooling efficiency can be achieved across the radiator when it is not arranged next to the engine, because the engine does not heat the air before it passes through the radiator.

The invention was described above in a simple and practical manner. However, since numerous modifications and changes will readily occur to those skilled in the art, the invention it is not limited to the exact constructional and operational details disclosed, and accordingly all suitable modifications and equivalents fall within the scope of the present invention.

What is claimed is:

1. A bulldozer comprising:
a vehicle frame having a front end and a rear end;
a pair of track frame modules arranged on left and right widthwise sides of the vehicle frame and extending in a longitudinal direction of the vehicle frame;
a blade support member supported on the vehicle frame, the blade support member including a frontward end and a rearward end, at least a rearward portion including the rearward end of the blade support member being disposed between the track frame modules in a widthwise direction of the vehicle frame;
a bulldozer blade supported on the frontward end of the blade support member such that the bulldozer blade is disposed in front of the front end of the vehicle frame;
an engine disposed at a front portion of the vehicle frame;
an operator cab secured to the frame behind the engine, the operator cab including a front window disposed on a front face of the operator cab; and
an engine cover covering the engine, the engine cover configured and arranged such that when the bulldozer blade is placed on the ground, an entire top surface of the engine cover is disposed below a line extending between an upper edge of the bulldozer blade and a lower edge of the front window as viewed from a side of the bulldozer.

2. The bulldozer as recited in claim 1, wherein
the top surface of the engine cover is downwardly sloped towards the bulldozer blade.

3. The bulldozer as recited in claim 1, further comprising
a pair of tank modules disposed respectively on a left side and a right side of the operator cab with a rear end of each of the tank modules being disposed rearwardly of a rear end of the operator cab,
a cooling module for cooling the engine, the cooling module being disposed behind the operator cab between the tank modules.

4. The bulldozer as recited in claim 1, wherein
the cooling module is disposed adjacent to the operator cab.

5. The bulldozer as recited in claim 1, wherein
the cooling module is angled so that an upper end of the cooling module is positioned forward with respect to a lower end of the cooling module.

6. The bulldozer as recited in claim 1, further comprising
a pair of tracks arranged on the track frame modules and extending in a forward-to-aft direction on left and right sides of the bulldozer, respectively, for supporting the vehicle frame, with the tracks extending rearwardly of the rear end of the vehicle frame, and
a cooling module for cooling the engine, the cooling module being disposed behind the operator cab at a rear end portion of the vehicle frame between the tracks.

7. The bulldozer as recited in claim 2, further comprising
a pair of tank modules disposed respectively on a left side and a right side of the operator cab with a rear end of each of the tank modules being disposed rearwardly of a rear end of the operator cab,
a cooling module for cooling the engine, the cooling module being disposed behind the operator cab between the tank modules.

8. The bulldozer as recited in claim 2, wherein
the cooling module is disposed adjacent to the operator cab.

9. The bulldozer as recited in claim 2, wherein
the cooling module is angled so that an upper end the cooling module is positioned forward with respect to a lower end of the cooling module.

10. The bulldozer as recited in claim 2, further comprising
a pair of tracks arranged on the track frame modules and extending in a forward-to-aft direction on left and right sides of the bulldozer, respectively, for supporting the vehicle frame, with the tracks extending rearwardly of the rear end of the vehicle frame, and
a cooling module for cooling the engine, the cooling module being disposed behind the operator cab at a rear end portion of the vehicle frame between the tracks.

11. The bulldozer as recited in claim 2, wherein
the top surface of the engine cover slopes downward starting from an end of the top surface disposed at the lower edge of the front window.

12. A bulldozer comprising:
a vehicle frame having a front end and a rear end;
a pair of tracks extending in a forward-to-aft direction on left and right sides of the center longitudinal axis of the bulldozer, respectively, for supporting the vehicle frame, with the tracks extending rearwardly of the rear end of the vehicle frame to form a cooling module recess that is disposed laterally between the tracks and at a rear end portion of the frame along the center longitudinal axis;
an engine supported on a front portion of the vehicle frame at a location along the center longitudinal axis of the bulldozer; and
a cooling module fluidly coupled to the front mounted engine for cooling the front mounted engine, the cooling module arranged at the rear end portion of the vehicle frame within the cooling module recess formed between the tracks, the cooling module being arranged such that the tracks extend beyond a rear end of the cooling module in the aft direction of the bulldozer.

13. The bulldozer as recited in claim 12, further comprising
an operator cab secured to the vehicle frame behind the engine, the operator cab including a front window disposed on a front face of the operator cab; and
an engine cover covering the engine, the engine cover configured and arranged such that when the bulldozer blade is placed on the ground, an entire top surface of the engine cover is disposed below a line extending between an upper edge of the bulldozer blade and a lower edge of the front window as viewed from a side of the bulldozer.

14. The bulldozer as recited in claim 12, further comprising
an operator cab secured to the frame behind the engine, the operator cab including a front window disposed on a front face of the operator cab; and
an engine cover covering the engine, a top surface of the engine cover being downwardly sloped toward the bulldozer blade; the engine cover configured and arranged such that when the bulldozer blade is placed on the ground, the top surface of the engine cover slopes more steeply than a line extending between an upper edge of the bulldozer blade and a lower edge of the front window as viewed from a side of the bulldozer.

15. A bulldozer comprising:
a vehicle frame having a front end and a rear end with a center longitudinal axis;
an engine disposed at a front portion on the vehicle frame along the center longitudinal axis of the bulldozer;
a first tank module disposed on a rear of a first lateral side of the bulldozer;
a second tank module disposed on a rear of a second lateral side of the bulldozer with a cooling module recess being formed laterally between the first and second tank modules at a rear end portion of the frame along the center longitudinal axis; and
a cooling module fluidly coupled to the engine for cooling the front mounted engine, the cooling module being coupled to the rear end portion of the vehicle frame within the cooling module recess, the cooling module being arranged such that the first tank module and the second tank module both extend beyond a rear end of the cooling module in the aft direction of the bulldozer.

16. The bulldozer as recited in claim 15, further comprising
an operator cab secured to the vehicle frame behind the engine, the operator cab including a front window disposed on a front face of the operator cab; and
an engine cover covering the engine, the engine cover configured and arranged such that when the bulldozer blade is placed on the ground, an entire top surface of the engine cover is disposed below a line extending between an upper edge of the bulldozer blade and a lower edge of the front window as viewed from a side of the bulldozer.

17. The bulldozer as recited in claim 15, further comprising
an operator cab secured to the frame behind the engine, the operator cab including a front window disposed on a front face of the operator cab; and
an engine cover covering the engine, a top surface of the engine cover being downwardly sloped toward the bulldozer blade, the engine cover configured and arranged such that when the bulldozer blade is placed on the ground, the top surface of the engine cover slopes more steeply than a line extending between an upper edge of the bulldozer blade and a lower edge of the front window as viewed from a side of the bulldozer.

18. A bulldozer comprising:
a vehicle frame having a front end and a rear end;
a pair of track frame modules arranged on left and right widthwise sides of the vehicle frame and extending in a longitudinal direction of the vehicle frame;
a blade support member supported on the vehicle frame, the blade support member having a frontward end and a rearward end, at least a rearward portion including the rearward end of the blade support member being disposed between the track frame modules in a widthwise direction of the vehicle frame;
a bulldozer blade supported on the frontward ends of the blade support members such that the bulldozer blade is disposed in front of the front end of the vehicle frame;
a bulldozer blade disposed in front of the front end of the vehicle frame;
an engine disposed at a front portion of the vehicle frame;
an operator cab secured to the frame behind the engine, the operator cab including a front window disposed on a front face of the operator cab; and
an engine cover covering the engine, a top surface of the engine cover being downwardly sloped toward the bulldozer blade, the engine cover configured and arranged such that when the bulldozer blade is placed on the ground, the top surface of the engine cover slopes more steeply than a line extending between an upper edge of the bulldozer blade and a lower edge of the front window as viewed from a side of the bulldozer.

19. The bulldozer as recited in claim 18, wherein
the engine cover is configured and arranged such that when the bulldozer blade is placed on the ground, the top surface of the engine cover slopes less steeply than a line extending between a lower edge of the bulldozer blade and a lower edge of the front window as viewed from a side of the bulldozer.

20. The bulldozer as recited in claim 18, wherein
the top surface of the engine cover slopes downward starting from an end of the top surface disposed at the lower edge of the front window.

* * * * *